United States Patent [19]

Pawlowski et al.

[11] Patent Number: 4,935,282
[45] Date of Patent: Jun. 19, 1990

[54] ABSORBENT INSERT FOR FOOD PACKAGES

[75] Inventors: Thomas D. Pawlowski, Neenah; William G. Ticknor, Larsen, both of Wis.

[73] Assignee: James River Corporation of Virginia, Richmond, Va.

[21] Appl. No.: 346,653

[22] Filed: May 3, 1989

[51] Int. Cl.⁵ .................................................. B32B 3/04
[52] U.S. Cl. .................................... 428/121; 426/107; 426/113; 426/124; 426/129; 428/74; 428/126; 428/136; 428/137; 428/138
[58] Field of Search ............... 428/136, 137, 138, 126, 428/74, 121; 426/107, 113, 124, 129

[56] References Cited

U.S. PATENT DOCUMENTS

| | | | |
|---|---|---|---|
| 2,621,129 | 12/1952 | Ramsbottom | 426/129 |
| 3,666,611 | 8/1969 | Joa | 428/74 |
| 4,321,997 | 3/1982 | Miller | 426/129 |
| 4,410,578 | 10/1983 | Miller | 426/129 |
| 4,551,377 | 11/1985 | Elves et al. | 426/129 |
| 4,720,410 | 1/1988 | Lundquist et al. | 428/136 |
| 4,756,939 | 7/1988 | Goodwin | 428/74 |
| 4,780,352 | 10/1988 | Palumbo | 428/138 |
| 4,786,513 | 11/1988 | Monforton et al. | 426/124 |

Primary Examiner—Ellis P. Robinson
Assistant Examiner—J. Weddington
Attorney, Agent, or Firm—William A. Aguele; Richard J. Gallagher; Thomas H. Whaley

[57] ABSTRACT

A package for meat products and other oily foods and similar products marketed in stores and suitable for use to heat or cook the contents by microwave radiation comprising a absorbent insert having as basic elements a cooking surface of waxed paperboard or the like and an absorbent underlay. The cooking surface on which the food is laid is provided apertures so that fats and liquids released from the food during cooking may readily pass therethrough and be captured by the absorbent underlayer.

7 Claims, 3 Drawing Sheets

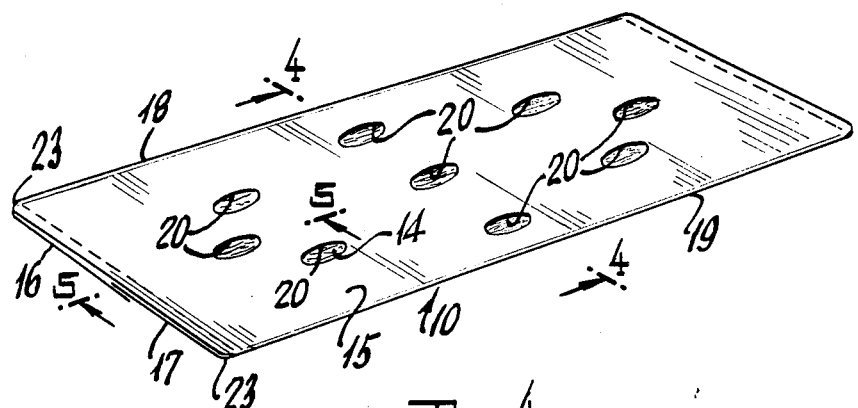
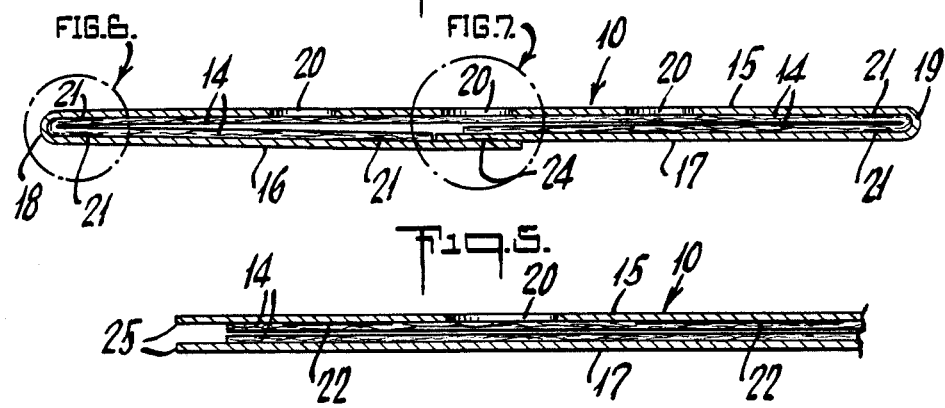
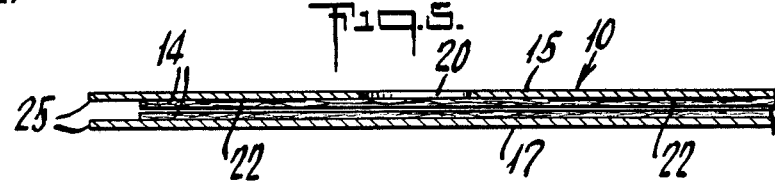
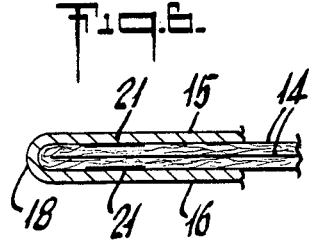
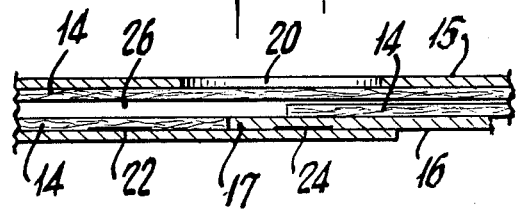

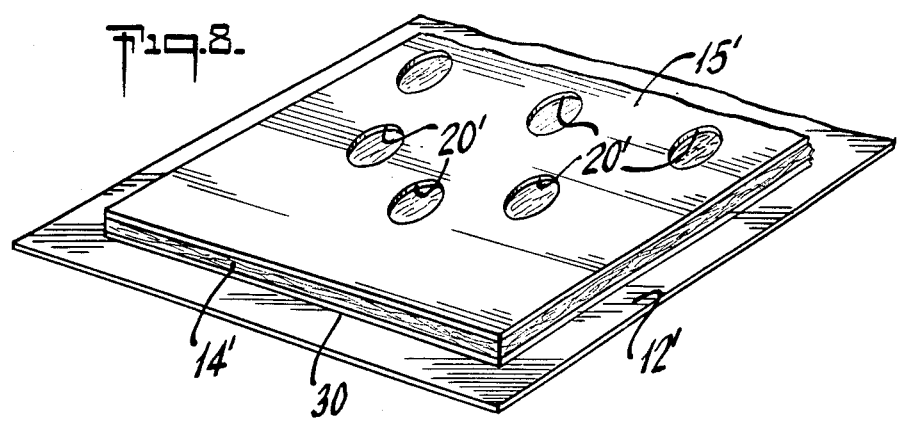
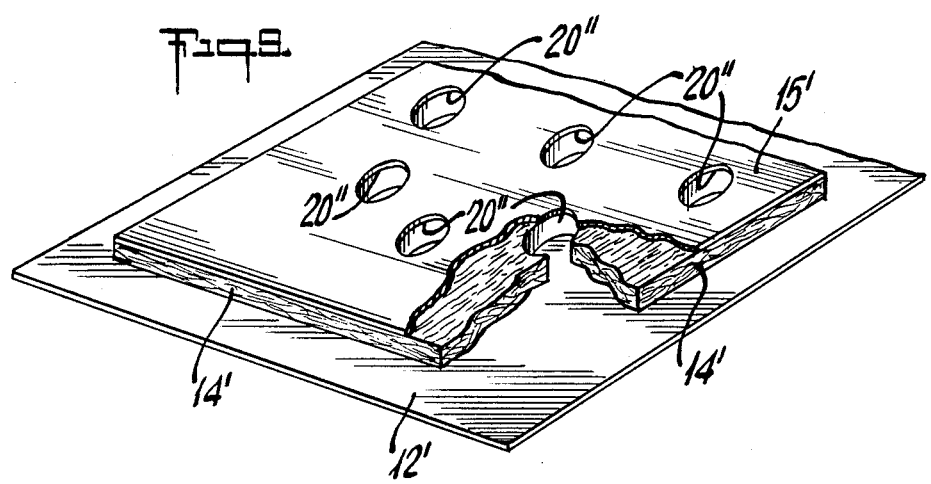
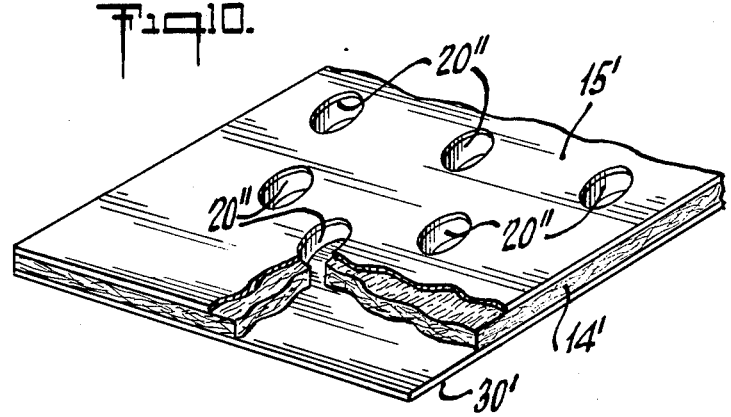

ABSORBENT INSERT FOR FOOD PACKAGES

This invention relates to an absorbent insert for packages of the type useful for packaging oily or greasy food products. In one of its more specific aspects, this invention relates to a food package especially suited to packaging food products for example, bacon, partially cooked or precooked meat, seafood, and the like, and for heating or cooking the food in the package in a microwave oven.

U.S. Pat. No. 4,720,410 to Lundquist et al is a recent example of the type of packaging to which the present invention is directed. As disclosed by Lundquist et al, a heat-shrinkable film with several holes or slits covers one surface of an absorbent pad or blotter of molded paper pulp adapted to absorb liquids released by a cured meat product laid on the film. The film is fastened to the blotter along its periphery so that, when heated, the film shrinks enlarging the openings in the film to permit better access of liquids from the meat product to the absorbent material while it is being cooked.

It is an object of this invention to provide an absorbent insert for packages which are suitable for storing, displaying and cooking meat and meat products and other food products containing fats or oils which are liquefied or liberated when the product is heated or cooked. Another object of this invention is to provide an absorbent insert for flexible film packaging operations. Still another object is to provide an insert suitable for use with machines for vacuum packaging bacon, hamburgers and similar products.

The insert of this invention is formed of two essential elements, namely a grease proof or grease resistant cooking surface having a predetermined pattern or arrangement of openings of predetermined size and shape sufficient to drain away the oily liquids released from bacon, for example, during cooking in a microwave oven, and one or more layers of an absorbent material to absorb liquids released from the food during cooking. In an illustrative bacon package example, strips of bacon are laid on the cooking surface of the insert by an automatic slicing machine, and this subassembly of meat product on the insert enclosed between two sheets of thermoplastic film the edges of which are fused under vacuum to form a hermetically sealed airtight package.

The present invention will be more clearly understood from the following detailed description taken in conjunction with the accompanying drawings.

BRIEF DESCRIPTION OF THE DRAWINGS

FIG. 3 is a perspective view of the insert illustrated in the package of FIG. 1;

FIG. 4 is an enlarged sectional view of the absorbent insert of FIG. 3 taken along the plane 4—4;

FIG. 5 is an enlarged partial sectional view of the insert of FIG. 3 taken along the plane 5—5;

FIG. 6 is a further enlargement of the portion of FIG. 4 encompassed by the phantom circle labeled FIG. 6; and FIG. 7 is a further enlargement of the portion of FIG. 4 encompassed by the phantom circle labeled FIG. 7;

FIG. 8 is a perspective view of another embodiment of the absorbent insert of this invention;

FIGS. 9 and 10 are perspective views, partially in vertical cross section, illustrating still other embodiments of the absorbent insert.

With reference to FIG. 1, a package of vacuum packed bacon is illustrated in which a preferred embodiment of an absorbent insert of this invention is incorporated. Several strips 11 of bacon are laid lengthwise on insert 10, preferably with little or no edge overlap. This sub-assembly is enclosed between two sheets of flexible packaging film 12 and 12' which are joined together at their edges by fusion or adhesion to form a hermetic package. The interior of the package may be subjected to vacuum before sealing is complete. The bacon is then said to be "vacuum packed" and such packaging is preferred for preservation of the product and customer acceptance.

FIG. 2 shows the two basic components of absorbent insert 10 used in the bacon package of FIG. 1, namely, a paperboard sleeve 13 (in an open condition) and absorbent web or sheet 14. Sleeve 13 may be formed from a paperboard blank having a central and main panel 15 and two lateral panels 16, 17. Fold lines 18, 19 are impressed in the blank between central panel 15 and lateral panels 16, 17, respectfully. Main panel 15 has several (nine shown) cut-outs or apertures 20. Adhesive strips 21 extend along the opposite sides of fold lines 18, 19 and along the edges of the blank parallel to fold lines 18, 19. It is advisable to have adhesive strips 21 end short of the blank edges to avoid adhesive appearing at the edges. Preferably, a few short adhesive strips 22 are applied to the center of main panel 15 between elliptical apertures 20.

Figure 1:
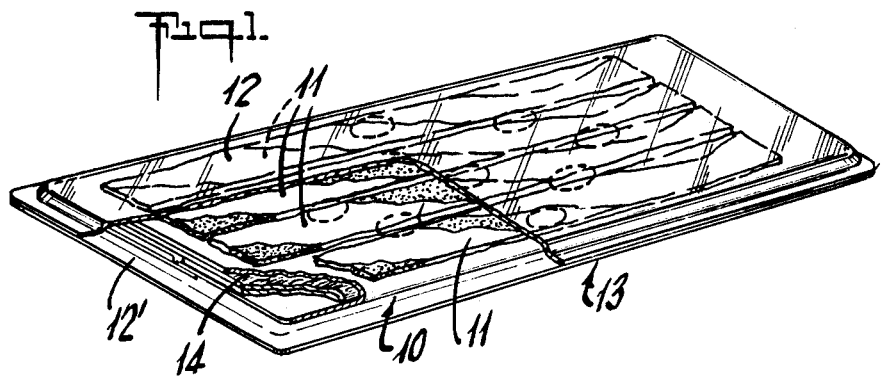
FIG. 1 is a perspective view of a package of bacon with slices of bacon laid on a preferred embodiment of the absorbent insert of this invention with successive layers partially cut away to show details of construction.

Before adhesive strips 21, 22 set, an absorbent layer 14 is laid on the paperboard blank of sleeve 13. Preferably, but not necessarily, absorbent layer 14 is smaller than the blank of sleeve 13 so that when it is laid thereon a border of about 0.25 to 0.5 inch of the blank of sleeve 13 will not be covered by pad 14. The border along the short sides of panels 15, 16, 17 serves to enclose absorbent layer 14 when sleeve 13 is closed, while the border along the long sides of panels 16, 17 is the overlap portion of panels 16, 17 when they are folded over along lines 18, 19. Adhesive applied to the overlap portion of 16, 17, seals them together and thus completes the formation of sleeve 13 with absorbent material 14 attached therein which is a preferred embodiment of the absorbent insert 10 of the invention.

The food product is laid on the main panel 15 so that any liquid expelled therefrom will flow through apertures 20 into absorbent sheet 14. The overlapped and joined panels 16, 17, become the bottom of the absorbent insert 10. It is evident that absorbent sheet 14 has a double thickness under apertures 20 because the portion of pad 14 on panels 16, 17 is folded back on the portion of pad 14 on panel 15. Preferably, the blank sleeve 13 is die cut so that each of panels 15, 16, 17 has rounded corners 23.

FIGS. 3 to 7 illustrate more clearly the details of construction of preferred sleeve of insert 10 with main panel 15 on top forming the cooking surface and overlapped and joined panels 16, 17 at the bottom to complete the closure of the sleeve. FIG. 4 is a cross-section of insert 10 through apertures 20 in main panel 15. Adhesive deposit 24 joins overlapped panels 16, 17. FIG. 5 is a partial cross-section of insert 10 at an open end thereof showing a border 25 on panels 15, 17 free of pad 14. This is done to hide or greatly minimize the visibility of pad 14 in absorbant insert 10. FIG. 6 which is an enlargement of the left edge portion of FIG. 4 shows more clearly panel 16 folded under panel 15 along fold line 18. Adhesive strips 21 along the opposite sides of fold line 18 to hold absorbant pad 14 in place appear one above the other.

Figure 2:
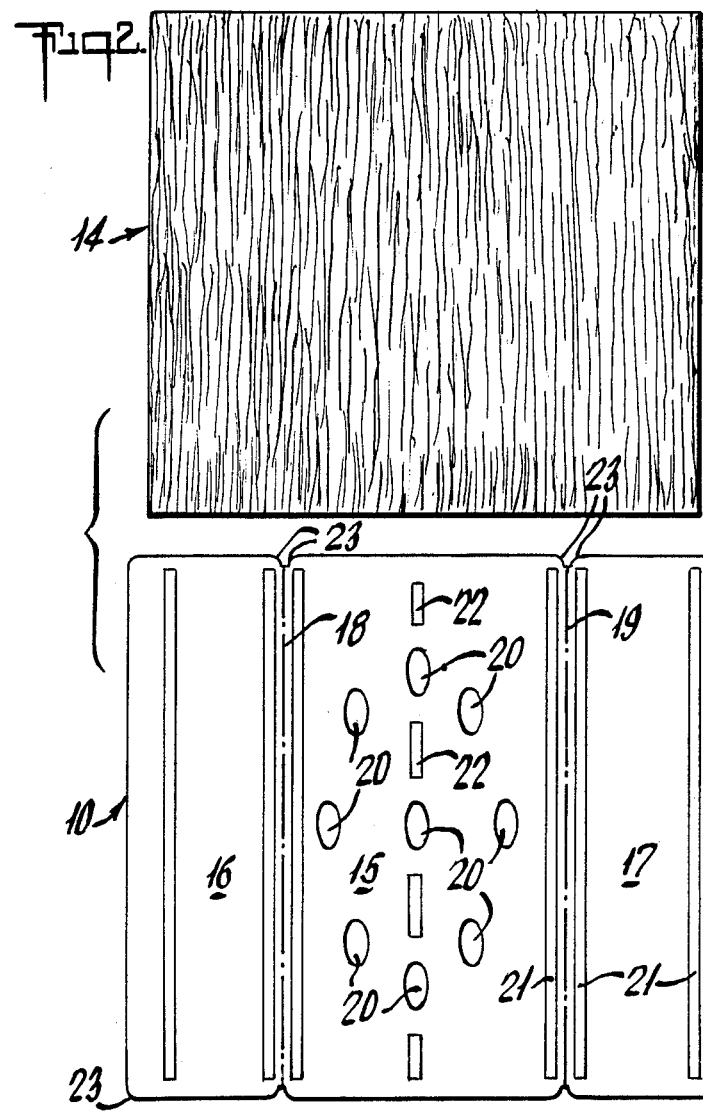
FIG. 2 is a plan view of the two basic components of the absorbent insert illustrated in the package of FIG. 1.

As an example of a preferred embodiment of the insert of this invention, a wax-impregnated paperboard blank of sleeve 13 as shown in FIG. 2 has central panel 15 with a width of about five and three quarters inches and lateral panels 16, 17 with a width of about three and one eighth inches each. The length of sleeve 13 is ten and one half inches. Absorbent layer 14 is about eleven and five sixteenths inches wide and 10 inches long. Absorbent layer 14 is positioned on, and attached by adhesive deposits 21, 22 to the blank of sleeve 13 so that a border of about one quarter inch at the top and bottom edges of the blank as well as at the free edge of panel 17 remains uncovered by pad 14. The uncovered border at the free edge of panel 16 about seven sixteenths inch; this uncovered border is slightly wider to facilitate the application of adhesive thereto and the joining of folded panel 16 to folded panel 17 as shown in FIG. 7.

In accordance with this invention, the absorbent insert is provided for a package for a food product which may be used not only for marketing the product but also as a container in which to cook the food by microwave radiation. The above-described preferred embodiment comprises a flat cooking surface 15, suitably of waxed paperboard, plastic, or other heat resistant sheet material having apertures 20 therein to permit liquids to drain through to the underlying absorbent layer or pad 14. In this embodiment, both the paperboard blank 13 and absorbent sheet layer 14 are folded over as described so that the absorbent material is completely enclosed within a paperboard sleeve, the absorbent layer or pad 14 is fastened to the inner surface of the sleeve by a suitable adhesive or other fastening means.

The cooking surface of the absorbent inserts of this invention, other modifications of which are illustrated in FIGS. 8 and 9 described hereinafter, suitably is formed from paperboard having sufficient stiffness to provide a flat support base for the food product. The paperboard is preferably one that has been treated to make it resistant to staining from contact with raw or partially cooked foods, including cured meats and meat products. Wax-impregnated paperboard is a suitable material for the cooking surface of the absorbent inserts but other materials and coatings may be employed as well. For example, the cooking surface may comprise a sheet of paperboard laminated or coated on both sides with polyethylene. Films or sheets of various resins, with or without paperboard laminates, may make up the surface in contact with the food product during storage and heating or cooking of the food. For example, the cooking surface may comprise or consist of films, coatings or sheets of nylon, polyethylene, polypropylene, polybutylene, polymethyl pentene, polyethylene terephthalate, polypropylene terephthalate, polybutylene terephthalate, polycarbonates, and the like.

The absorbent layer may be made up of any material capable of absorbing fats or liquids during cooking. Absorbent materials suitable for use in the absorbent layer include, for example, air laid cellulosic webs, water laid cellulosic webs, melt blown fiber webs, open cell foams of heat resistant resins of the type mentioned above, and the like. An air-laid, latex bonded cellulose web, for example, the product marketed by James River Corporation under the trademark AIR-TEX, is a preferred absorbent material for the absorbent insert of this invention. In the specific example of a bacon package, an air laid web having a dry basis weight of 65–70 g/m² is adequate.

In the specific embodiment of the absorbent insert of this invention as illustrated in FIGS. 1–7 the absorbent layer 14 is slightly less than that of the paperboard blank 13. The length of the pad is less than that of the blank 13 so that the opposite ends of the pad are spaced slightly, for example, from about one-quarter inch to about one-half inch from the ends of the central panel cooking surface 15 and from the ends of side panels 16 and 17. Similarly, the width of absorbent layer 14 is less than the width of the blank 13 so that the absorbent layer does not lap over at the back seam of the sleeve where panels 16 and 17 are joined together. In the embodiment as illustrated applications of an adhesive between the inner surface of the blank and the absorbent layer holds the absorbent layer in the desired position. A number of heat resistant, grease resistant adhesives are commercially available and suitable for this purpose.

The design of the insert is determined by the needs of the food product packaged with the insert, the required thickness of the absorbent layer depending on the amount and kind of fluid released during the cooking cycle. Two layers of an absorbent layer of cellulose fibers having a basis weight of 75 grams per square meter has been found adequate for bacon packaging but the required amount may be greater or less depending on the amount of absorbent needed for the particular product. Depending upon the specific absorbent used and the end use requirements the absorbent layer may be coextensive with the entire area of the cooking surface or may extend over only selected areas of the cooking surface. Apertures may be cut through one or more layers of absorbent as illustrated in FIGS. 9 and 10.

FIGS. 8 to 10 illustrate further embodiments of this invention wherein like reference numerals designate like parts of the absorbent insert. With reference to FIG. 8, the absorbent insert comprises a single sheet of waxed paperboard or the like making up the cooking surface 15'. The cooking surface 15' is provided with apertures 20' for the free flow of fluids therethrough to the absorbent layer 14' which is coextensive in area with that of the cooking surface. The absorbent layer may be secured to the cooking surface by means of adhesive or by any other suitable fastening means, e.g. fusion to a plastic or plastic laminate comprising the cooking surface layer. A sheet 30 or plate of plastic or coated paperboard may be attached to the underside of the absorbent layer 14' and may be coextensive therewith as illustrated or slightly larger and may have turned up edges (not illustrated). The insert is placed on plastic sheet 12', as in FIG. 1, prior to receiving the food load after which it is covered by sheet 12 and sealed thereto as in FIG. 1.

FIGS. 9 and 10 illustrate still further embodiments of absorbent inserts of this invention in which the cooking surface 15' is attached to an absorbent layer 14' or to multiple layers of absorbent sheet material and in which the apertures 20' extend through both the cooking surface 15' and the absorbent layer 14'. As illustrated in FIG. 9, the absorbent layer may be placed directly on the plastic sheet 12' which is imperveous to oil and grease and which forms part of the hermetically sealed package as described in connection with FIG. 1. As illustrated in FIG. 10, the absorbent layer 14' may be attached to a base sheet 30 of wax impregnated paperboard or a plastic to retain absorbed fluids in the absorbent insert. The aperture arrangements illustrated in FIGS. 9 and 10 are advantageously used where the product, when heated, releases juices which tend to coagulate unless drained away promptly from the food. As an example, a hamburger patty requires rapid removal of juices during cooking for best appearance and flavor of the cooked product.

Important advantages of the absorbent inserts of this invention have been observed in trial tests of the package of FIG. 1. When bacon was cooked in this package in a microwave oven it was found by a taste test to produce a pan fried flavor with excellent and uniformly consistent color and flavor and with less shrinkage of the bacon as compared with pan fried specimens. It is believed that the improved results are due in part to moisture contained in the absorbent layer prior to packaging and to moisture absorbed from the bacon prior to cooking. Moisture in the absorbent material results in rapid heating of the insert which aids in producing uniformity of color and texture in the cooked bacon.

We claim:

1. An absorbent insert for a package used to display and cook a food product laid thereon, which comprises a paperboard blank resistant to staining from contact with said food product, said blank having an apertured central panel and a lateral panel along each of two opposite edges of said central panel, the combined width of the two lateral panels being greater than the width of said central panel, a fold line impressed along each of said opposite edges of said central panel, an absorbent layer attached by adhesive to said blank, the edges of said absorbent layer being spaced inwardly from the edges of said blank, and adhesive fastening the overlapped portion of said two lateral panels folded inward over said absorbent layer.

2. An absorbent insert according to claim 1 wherein the blank is wax impregnated paperboard and the absorbent layer is an air-laid cellulose web.

3. An absorbent insert according to claim 2 wherein the overlap of the folded two lateral panels is at least about one half inch.

4. An absorbent insert according to claim 2 wherein the central panel has an alignment of spaced apertures equidistant from the fold lines and said alignment includes adhesive deposits between said spaced apertures fastening said central panel to the absorbent layer.

5. An absorbent insert for a package used to display and cook a food product laid thereon, which comprises a flat sleeve having apertures on the side on which said food product is laid, said sleeve being resistant to heat and staining from contact with said food product, and an absorbent layer of cellulose within said sleeve with the ends of said absorbent layer being spaced about one quarter inch inwardly from the ends of said sleeve.

6. An absorbent insert according to claim 5 wherein the sleeve is wax-impregnated paperboard and the absorbent layer is an air-laid cellulose web.

7. An absorbent insert according to claim 1 wherein adhesive strips adjacent the opposite sides of each fold line and adjacent the opposite edges of the paperboard blank parallel to said fold lines fasten the absorbent layer to said blank.

* * * * *